US00RE42912E

(19) United States
(12) Reissued Patent
McGinness et al.

(10) Patent Number: US RE42,912 E
(45) Date of Reissued Patent: Nov. 15, 2011

(54) UNIVERSAL RAIL MOUNTING BRACKET

(75) Inventors: William McGinness, Pinson, AL (US); Randall Heath, Birmingham, AL (US); Maurice Coen, Orange Park, FL (US)

(73) Assignee: Homeland Vinyl Products, Inc., Pinson, AL (US)

(21) Appl. No.: 12/603,747

(22) Filed: Oct. 22, 2009

Related U.S. Patent Documents

Reissue of:
(64) Patent No.: 7,487,941
Issued: Feb. 10, 2009
Appl. No.: 11/627,159
Filed: Jan. 25, 2007

U.S. Applications:
(60) Provisional application No. 60/763,461, filed on Jan. 30, 2006.

(51) Int. Cl.
*A47B 96/06* (2006.01)
(52) U.S. Cl. ..... 248/220.21
(58) Field of Classification Search ..... 248/220.21, 248/220.1, 229.11, 229.21, 228.21, 230.2, 248/231.31, 205.1, 219.4, 298.1
See application file for complete search history.

(56) References Cited

U.S. PATENT DOCUMENTS

| | | | | |
|---|---|---|---|---|
| D221,141 | S | 7/1971 | Wormser | |
| 3,636,342 | A * | 1/1972 | Blount | 248/310 |
| 3,804,358 | A * | 4/1974 | Gunther | 248/205.1 |
| 5,358,205 | A * | 10/1994 | Starkey et al. | 248/220.21 |
| 5,772,185 | A | 6/1998 | Pulsipher | |
| 5,853,167 | A | 12/1998 | West et al. | |
| 5,988,599 | A | 11/1999 | Forbis | |
| 6,027,089 | A * | 2/2000 | Maharg et al. | 248/220.21 |
| 6,041,486 | A | 3/2000 | Forbis | |
| 6,202,987 | B1 | 3/2001 | Forbis | |
| D446,315 | S | 8/2001 | Forbis | |
| 6,513,772 | B2 * | 2/2003 | Gary et al. | 248/231.91 |
| 7,025,309 | B2 * | 4/2006 | Goodwin et al. | 248/74.4 |
| 7,427,055 | B2 | 9/2008 | Platt | |

* cited by examiner

*Primary Examiner* — Ramon O Ramirez
(74) *Attorney, Agent, or Firm* — Smith, Gambrell & Russell

(57) ABSTRACT

A universal rail mounting bracket for attachment of a handrail or fence rail to a support structure. An adapter is also disclosed which is matingly engageable with the bracket, the adapter providing a suitable geometric mating surface with a support structure to which the rail will be attached, such as a wall, fence post, or column. By substitution of the adapter portion, the bracket portion can be adapted to virtually any surface and can support the attachment of the rail such that is may extend at any desired angle.

29 Claims, 6 Drawing Sheets

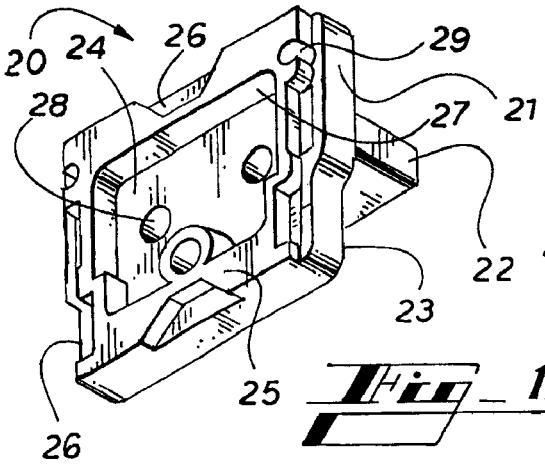
Fig. 1A
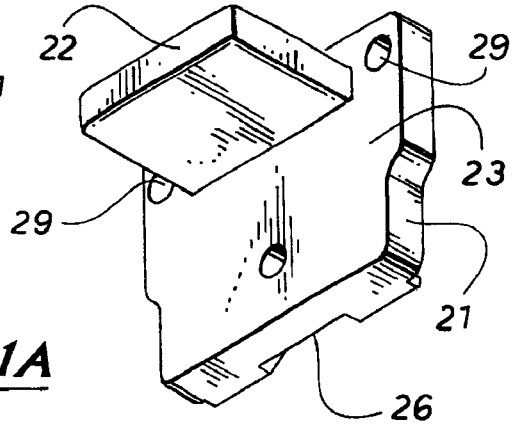
Fig. 1B
Fig. 1C
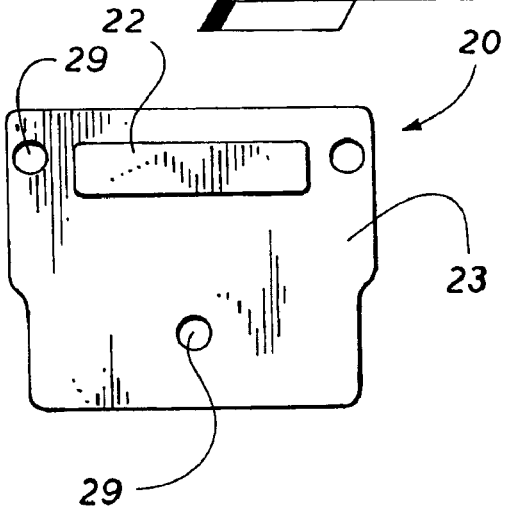
Fig. 1D
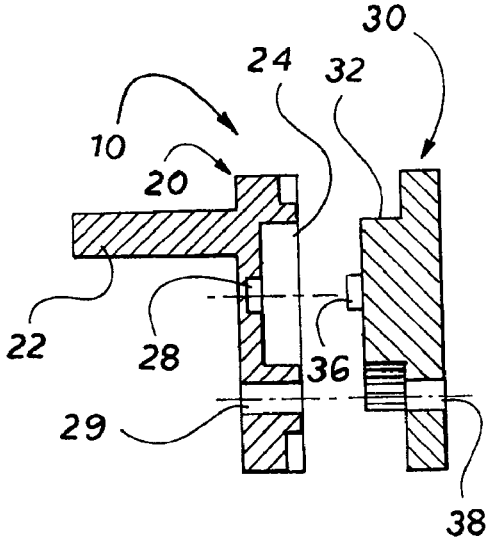
Fig. 1E
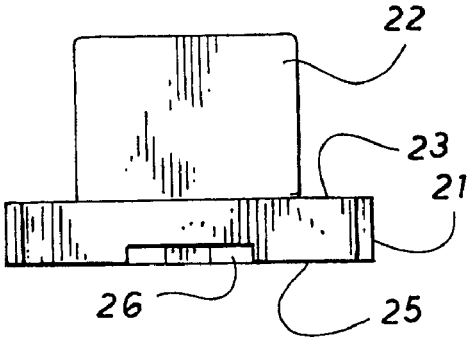

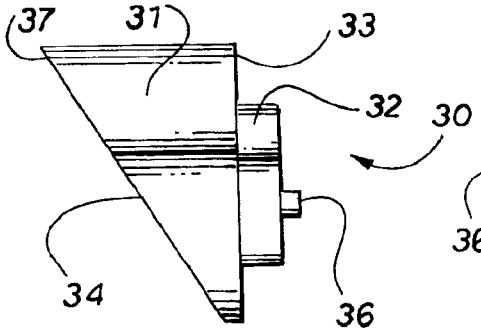
Fig. 2A
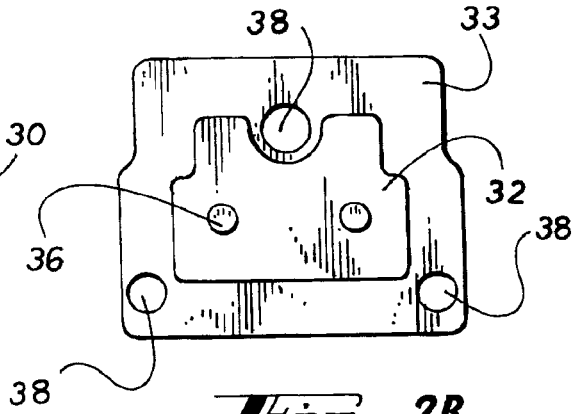
Fig. 2B
Fig. 2C
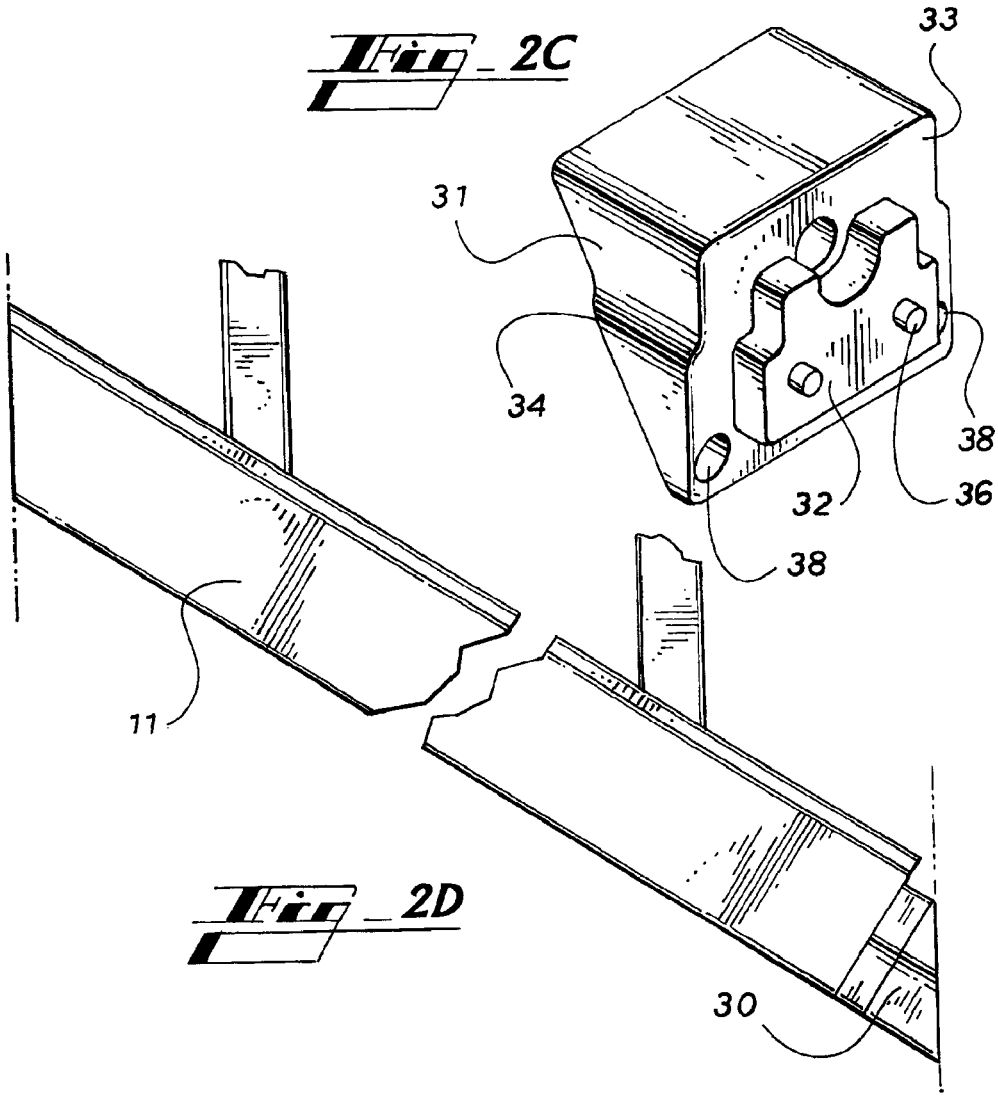
Fig. 2D

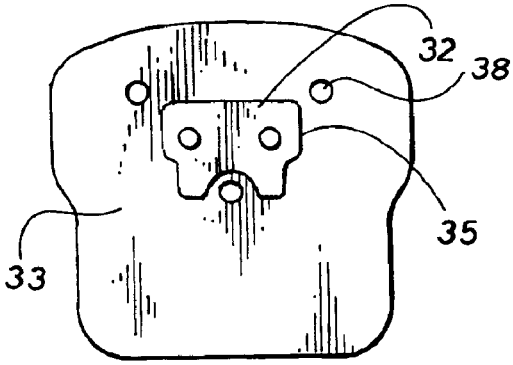
Fig. 3A
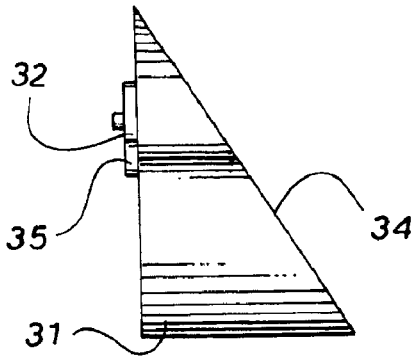
Fig. 3B
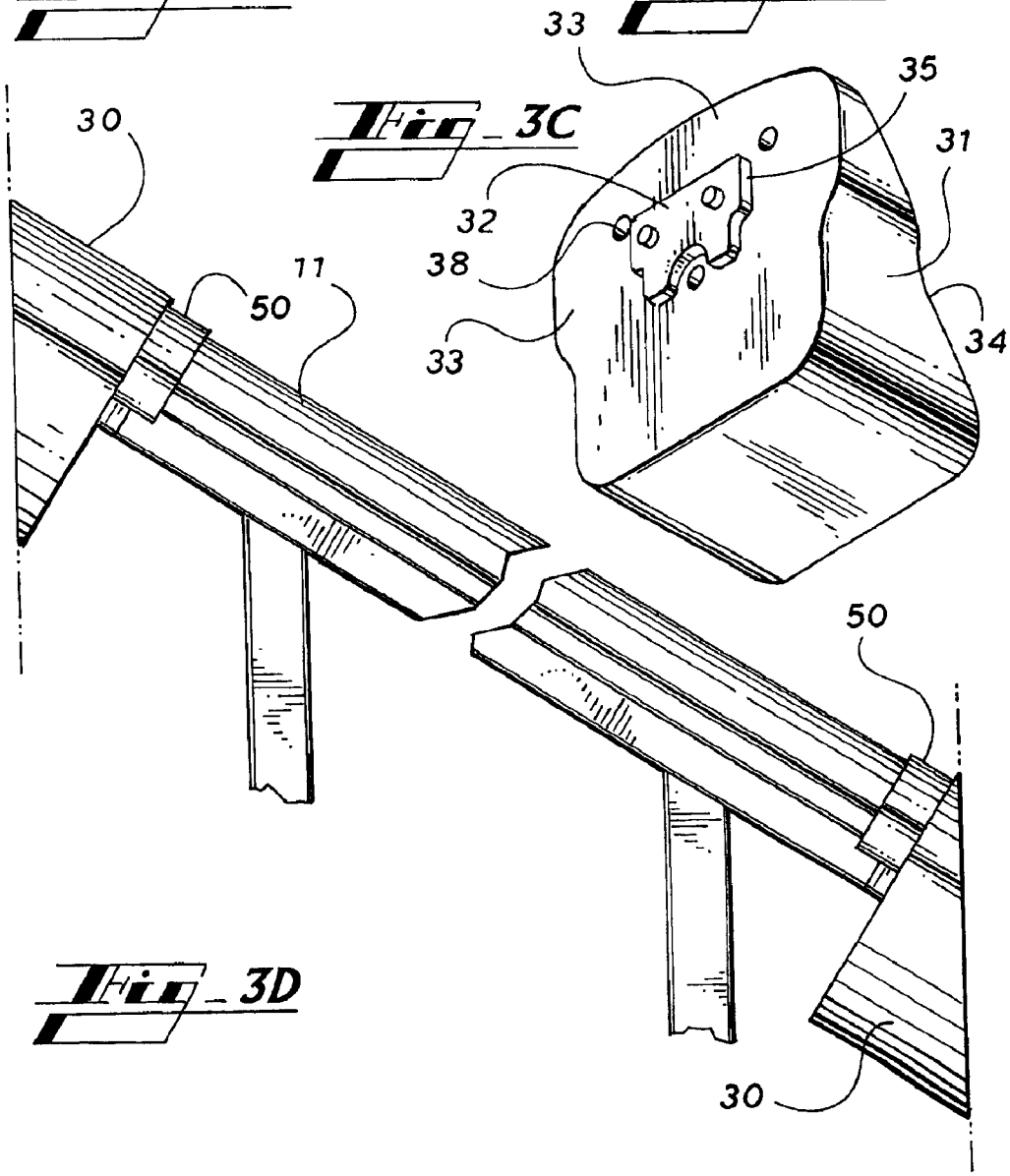
Fig. 3C
Fig. 3D

UNIVERSAL RAIL MOUNTING BRACKET

Matter enclosed in heavy brackets [ ] appears in the original patent but forms no part of this reissue specification; matter printed in italics indicates the additions made by reissue.

*This application is a re-issue application of Ser. No. 11/627,159, filed Jan. 25, 2007 entitled: "Universal Rail Mounting Bucket" which issued Feb. 10, 2009 as U.S. Pat. No. 7,487,941. This application claims priority from provisional patent application Ser. No. 60/763,461 filed Jan. 30, 2006. This application is related to co-pending divisional application Ser. No. 12/119,753.*

FIELD OF THE INVENTION

The present invention relates generally to the field of handrails, fences and guard rails. More particularly, the invention relates to a mounting bracket for attaching a rail to a support structure or building. With even greater particularity, the present invention relates to a universal mounting bracket for mounting a rail to conform to the surface of a support structure in a structurally and visually appealing manner.

BACKGROUND OF THE INVENTION

In the art of fences numerous materials and methods have been employed to construct and design fences for various purposes such as containment of livestock, pets, people and the like or for the exclusion of the same. Similarly, guardrails have been employed for the containment or protection of people from hazards. For example, guardrails are commonly utilized on balconies and stairways in high rise apartments, hotel accommodations, office complexes, shopping malls, single family dwellings, and the like. In other instances, fences and guardrails may be employed to add a decorative or aesthetic flourish to such structures and landscapes, and may be found in both interior and exterior applications.

A commonly used fence or guardrail configuration is a rail and spindle design, wherein the fence or guardrail generally comprises upper and lower horizontally disposed rails and a plurality of spindles, vertically disposed between the rails and spaced apart. This common configuration lends itself to construction with numerous materials, depending upon the desired application. For example, a guardrail for a patio deck may simply be constructed with treated lumber, the rails generally being 2"×4" boards, and the spindles being 1"×1" boards. By contrast, a guardrail for an interior balcony or stairway, may be elegantly constructed of finely finished hardwoods, polished brass, and the like. Wrought iron, aluminum, and the like are other common materials for such guardrails and fences.

Traditionally, mounting the rails to the supporting structure has been accomplished by an L-shaped bracket, wherein each leg of the bracket has a plurality of holes for receiving a bolt or screw for attachment between the rail and the supporting structure. These simple brackets present the ability to adapt to a wide range of applications and provide generally sound structural support. However, they typically do not present an attractive decorative appearance.

In many applications, the support structure, whether the walls of a building, a fence post, column or the like, will present an irregular surface contour. As such, the resultant attachment of the rail to the support structure will compromise structural integrity of the bracket attachment due to the surface irregularities and the interface with the bracket. Often use of such brackets in these situations will sacrifice decorative appeal, leaving unsightly gaps between the rail and the structure.

An additional consideration present in rail applications, whether used as a fence or as handrail is presented by the angle at which the rail is supported with respect to the support structure. For applications in stairways, the rail is preferably mounted to match the slope of the stairway. This requires that the rail be capable of being mounted with a vertical deflection. Similarly, for fence or guard rail applications, it is often desirable that the fence or guardrail section be mounted at a horizontal angle with respect to its supporting structures. While specialized brackets may be specifically manufactured to suit each particular application, the costs associated with the same are prohibitive. Moreover, repair or replacement of such brackets presents the arduous task of locating the manufacturer and obtaining a suitable replacement.

BRIEF SUMMARY OF THE INVENTION

The present invention solves many of the aforementioned problems with existing fence and guard rail mounting brackets. The universal mounting bracket contemplated by the present invention is a bracket assembly comprising a bracket portion and an adapter portion. The bracket provides a suitable support structure for mounting a rail to a supporting structure. A first end of the adapter is matingly engagable with the bracket and provides a suitable geometric mating surface with a support structure to which the rail will be attached, such as a wall, fence post, or column. By substitution of the adapter portion, the bracket portion can be adapted to virtually any surface and can support the attachment of the rail such that is may extend at any desired angle.

The bracket comprises a mounting plate and a support flange extending from a first surface of the mounting plate. The support flange is provided for supporting attachment to the rail. Preferably the support flange has one or more apertures for receiving bolts, pins, or screws to securely attach the bracket to the rail. The mounting plate has one or more apertures extending through the first surface of the mounting plate to a second surface of the mounting plate for receiving one or more fasteners, such as bolts, pins, nails or screws, to attach the bracket assembly to the support structure. The second surface of the mounting plate comprises an adapter interface that provides for coupling engagement with the adapter. The bracket may be formed of a metallic, composite, or other approved construction material, and is preferably made of aluminum.

The adapter comprises a body having a bracket interface defined at a first end for coupling engagement with the adapter interface of the bracket mounting plate. One or more apertures are defined through the bracket adapter and are disposed for coaxial alignment with the apertures defined in the bracket mounting plate such that the adapter may be positioned between the bracket and the supporting structure upon attachment to the structure.

The adapter further comprises an attachment interface at a second end of the adapter body. The attachment interface comprises a geometric surface defined to substantially conform to an outer surface of said support structure, such that, upon attachment the bracket will have suitable structural integrity and present an attractive visual appearance.

BRIEF DESCRIPTION OF THE SEVERAL VIEWS OF THE DRAWINGS

FIG. 1A depicts a rear perspective view of a bracket;

FIG. 1B depicts a front perspective view of a bracket;

FIG. 1C depicts an front elevation view of a bracket;

FIG. 1D depicts a plan view of a bracket;

FIG. 1E depicts a cross sectional view of a bracket;

FIG. 2A depicts a side elevation view of a triangular body adapter for attachment at a vertical angular deflection;

FIG. 2B depicts a front elevation view of an adapter;

FIG. 2C depicts a front perspective view of a triangular body adapter for attachment at a vertical angular deflection;

FIG. 2D depicts a side elevation view of a triangular body adapter and mounted rail;

FIG. 3A depicts a front elevation view of an alternative triangular body adapter;

FIG. 3B depicts a side elevation view of an alternative triangular body adapter;

FIG. 3C depicts a perspective view of an alternative triangular body adapter;

FIG. 3D depicts a side elevation view of a rail installation with an alternative triangular body adapter and rail end cover;

DETAILED DESCRIPTION OF THE INVENTION

Figure 4A:
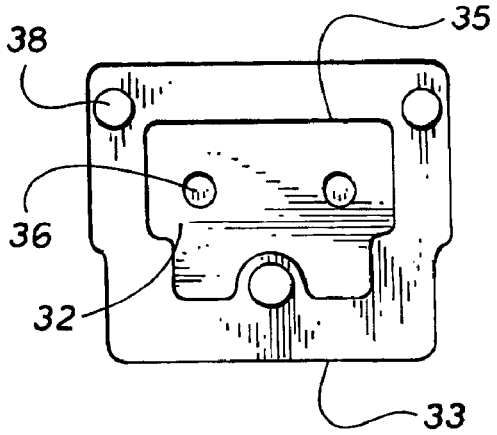
FIG. 4A depicts a front elevation view of an adapter for attachment to a cylindrically curved surface.

The universal mounting bracket contemplated by the present invention includes a bracket assembly 10 comprising a bracket 20 and an adapter 30. The bracket 20 provides a suitable support structure for mounting a rail 11 to a supporting structure. The adapter 30 provides a suitable mating surface 34 for the bracket assembly 10 to permit a structurally sound attachment of the bracket assembly 10 and the rail 11 to a support structure. The invention contemplates that the bracket 20 will have universal application, regardless of the geometric surface of the support structure. The invention further contemplates a plurality of adapters 30 which have a variety of mating surfaces, or attachment interfaces 34 selected to match the geometric surface of the support structure.

Referring to the drawings for a more complete description of the invention, FIGS. 1A-E depict an exemplary bracket 20 according to the present invention. Bracket 20 comprises a mounting plate 21 and a support arm 22 extending from a first surface 23 of the mounting plate 21. Support arm 22 may be attached to a lower surface of a rail 11 by any suitable means, such as fasteners, adhesives, and weldments. Mounting plate 21 has an adapter interface 24 defined on or in a second 25 or opposite surface. Adapter interface 24 is provided to cooperatively engage with a corresponding bracket interface 32. As depicted in the various drawings, bracket 20 and adapter 30 are shown with adapter interface 24 in a female, receptive configuration, whereas bracket interface 32 is depicted in a male, insertion configuration. Adapter interface 24 is defined by a wall 27 circumscribing a central recessed area. The invention contemplates that the male and female relationships may be reversed without difficulty and without departing from the claimed invention. As may be seen one or more apertures 29 are defined through mounting plate 21 such that the bracket may be attached to the structure by any suitable fasteners.

Figure 4B:
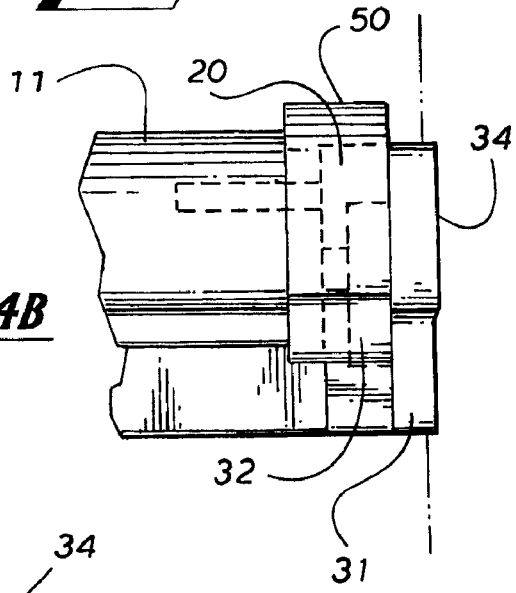
FIG. 4B depicts a side elevation view of a universal rail mounting bracket assembly supporting a rail.
Figure 4C:
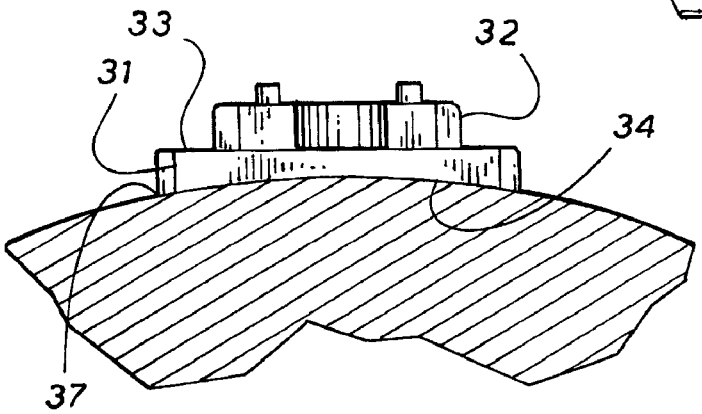
FIG. 4C depicts a plan view of an adapter positioned for attachment to a cylindrically curved support structure surface.
Figure 4D:
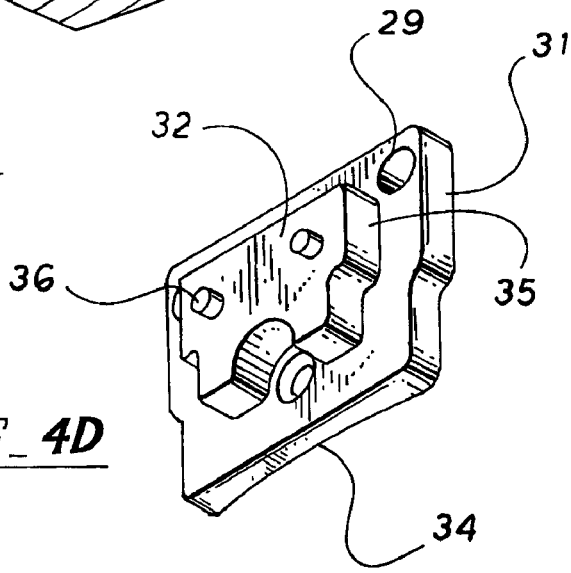
FIG. 4D depicts a front perspective view of an adapter for attachment to a cylindrically curved surface.
Figure 5A:
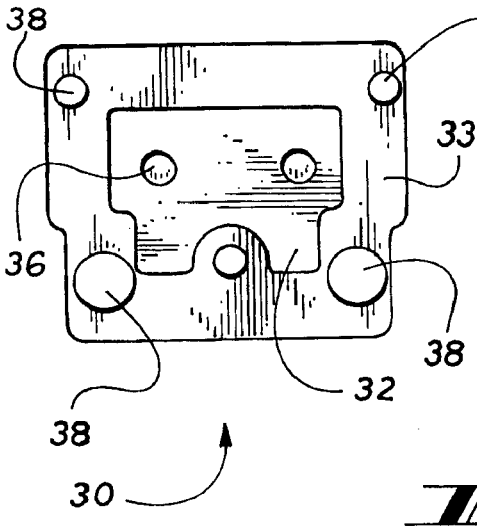
FIG. 5A depicts a front elevation view of an adapter for attachment to an angular surface.
Figure 5B:
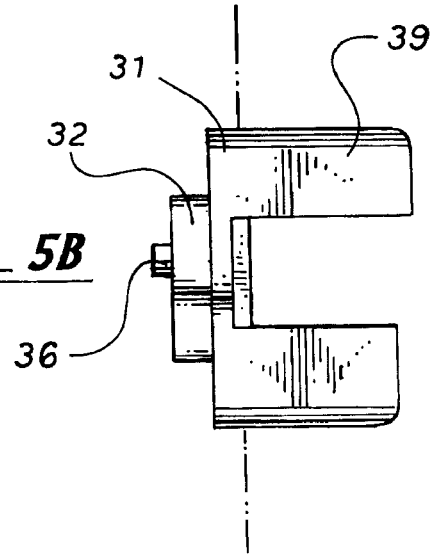
FIG. 5B depicts a side elevation view of an adapter positioned for attachment to an angular surface support structure.
Figure 5C:
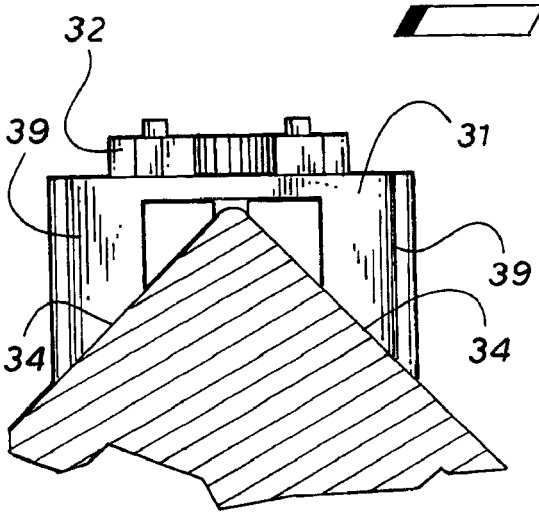
FIG. 5C depicts a front perspective view of an adapter for attachment to an angular surface.
Figure 5D:
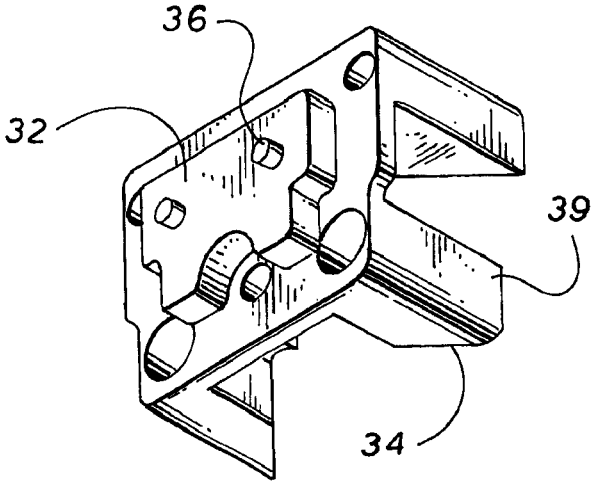
FIG. 5D depicts a rear perspective view of an adapter for attachment to an angular surface.
Figure 6A:
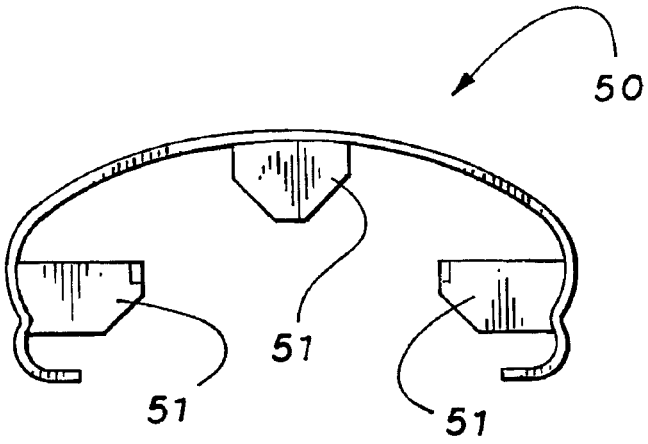
FIG. 6A depicts a front elevation view of a rail end cover.
Figure 6B:
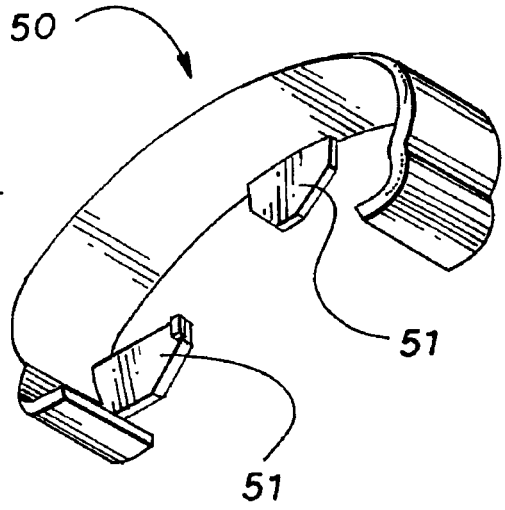
FIG. 6B depicts a front perspective view of a rail end cover.
Figure 6C:
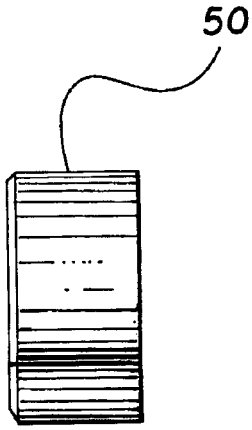
FIG. 6C depicts a side elevation view of a rail end cover.

Optionally, mounting plate 21 may further include one or more slots 26 along its peripheral edge. Slots 26 are adapted to receive one or more fingers 51 extending from an inner surface of a rail end cover 50, such as that depicted in FIGS. 6A-C. Rail end cover 50 may be inserted over the rail 11 end after the rail 11 has been mounted with the bracket assembly 10 so as to cover any unsightly gaps or uneven cuts which may have occurred during manufacture or installation, as is best seen in reference to FIGS. 3D and 4B.

In reference to FIGS. 2-5 various exemplary forms of adapter 20 may be seen. For sake of clarity, like parts of adapter 20 are shown with the same reference numbers. Adapter 20 comprises a body 31 having a bracket interface 32 defined at a first end of said body 31 and an attachment interface 34 defined at a second end 37 of said body 31.

As mentioned previously, bracket interface 32 provides for cooperative engagement with adapter interface 24. In the embodiments shown, bracket interface 32 is defined by a raised portion extending from the first end 33 of adapter body 31 and shaped to conform to said adapter interface 24 of the bracket 20. More preferably, the peripheral surface 35 of the raised portion is dimensioned to provide an interference fit with wall 27 of the adapter interface 24. Optionally, bracket interface 32 is provided with at least at least one alignment protrusion or pin 36 disposed to engage with an alignment bore 28 defined in the surface of adapter interface 24.

Attachment interface 34 is defined at a second end 37 of the adapter body 31 and comprises a geometric or mating surface 34 defined to substantially conform to an outer surface of said support structure. One or more apertures 38 are defined in body 31 which extend between bracket interface 32 and attachment interface 34 and are disposed for alignment with apertures 29 defined in bracket 20, such that when bracket 20 and adapter 30 are coupled, apertures 29 and 38 are coaxially aligned. Apertures 29 and 38 are aligned to receive fasteners to secure bracket assembly 10 and the rail 11 mounted thereon to the supporting structure. Once installed adapter 30 will be positioned between bracket 20 and the structure. By selecting an adapter 30 with a suitable attachment interface 34 to correspond with the geometric surface of the outer surface of the structure, the bracket assembly 10 will have a more structurally sound and visually appealing attachment to the structure.

As seen in FIGS. 2 and 3, attachment interface 34 is substantially planar. These adapters are configured to permit attachment of a rail 11 at an angle with respect to the structure. In both instances body 31 is substantially triangular such that attachment interface 34 is at an angle with respect to bracket interface 32. When assembled and attached to the structure the longitudinal axis of support arm 22, and consequently the rail 11 mounted thereon, will be offset at the angle of defined by body 31. In the trade it is desirable to offset a rail 11 in either a horizontal or vertical angle. For example adapters such as those shown in FIGS. 2 and 3 are particularly suited for a vertical angular mounting, such as along a stairway or to add an upwardly or downwardly sloping fence section. If the triangular body 31 is rotated with respect to bracket interface 32, the adapter 30 may be modified such that it is suited for lateral angular displacement of a rail 11, such as would be required to change direction along a fence line. An adapter providing lateral angular displacement is also desirable for such structures as a gazebo wherein the rails 11 would typically have a lateral angular displacement at each support member in the structure. For a more finished appearance, body 31 is more preferably shaped to generally conform to the shape and dimensions of the rail 11.

The universal rail mounting bracket of the present invention is also particularly suited for secure attachment of a rail 11 to a cylindrical column. An adapter 30 such as that depicted in FIGS. 4C-D, should be provided. In this instance, body 31 comprises a plate having bracket interface 32 defined on the first end of the plate 31 and attachment interface 34 defined on a second end of the plate 31. Attachment interface 34 has a curved surface with a radius of curvature corresponding to that of the supporting column. In the particular embodiment shown, curved surface is concave, however if the supporting column were fluted or otherwise provided surface ornamentation, a protuberance could readily be added to the curved surface to adapt to the fluted or ornamented surface of the column.

In many instances, such as with a square or other polygonal columns or posts, it may be desirable to attach the rail 11 to extend from a corner. In these cases, an adapter such as that shown in FIGS. 5A-D is highly desirable. In the particular embodiment shown, adapter body 31 again comprises a plate with a plurality of extensions 39 projecting from the second end of body 31. The end faces 34 of the extensions 39 are defined at an angle, preferably converging towards a longitudinal centerline of the adapter 30 such that opposed end faces 34 provide the desired angular attachment interface 34. For example, end faces 34 would be defined at a 45 degree angle to provide a 90 degree attachment interface 34 suitable securement of the bracket assembly 10 to a corner of a square post or column.

As may be seen, the versatility of the universal mounting bracket of the present invention is that the same bracket may be utilized and adapted to virtually any surface of a support structure. The bracket 20 may be formed of a metallic, composite, or other approved construction material, and is preferably made of aluminum. The versatility of the adapter, which may be similarly be formed of any suitable material, but is preferably a plastic or vinyl, is that a given adapter 30 or series of adapters 30 may be inexpensively manufactured.

It should be understood that although examples of preferred embodiments of the invention have been disclosed herein in some detail, modifications and variations might be made without departing from the spirit and scope of the invention. Accordingly, all forms of the invention are claimed that come within the scope of the appended claims.

What is claimed is:

1. A device for mounting a rail to a support structure, the device comprising a bracket and an adapter;

a) said bracket comprising a mounting plate having a support arm extending from a first surface of said mounting plate, and an adapter interface comprising a recessed area defined in a central portion of a second surface of said mounting plate;

b) said adapter comprising a body having a bracket interface defined at a first end of said body, an attachment interface defined at a second end of said body, said bracket interface comprising a raised portion extending from said first end of said adapter body and shaped to conform to said recessed area;

c) wherein said adapter interface and said bracket interface are defined to matingly engage each other; and d) said attachment interface comprises a geometric surface defined to substantially conform to an outer surface of said support structure.

2. A device for mounting a rail to a support structure, the device comprising a bracket and an adapter;

a) said bracket comprising a mounting plate having a support arm extending from a first surface of said mounting plate, an adapter interface defined on a second surface of said mounting plate, and a first aperture defined between said first and second surfaces, wherein said adapter interface comprises a raised portion extending from said second surface, b) said adapter comprising a body having a bracket interface defined at a first end of said body, an attachment interface defined at a second end of said body, and a second aperture defined between said first end and said second end, wherein said bracket interface comprises a recessed area defined in a central portion of said first end and said raised portion is shaped to conform to said recessed area;

c) said adapter interface and said bracket interface matingly engage each other with said first and second apertures coaxially aligned; and d) said attachment interface comprises a geometric surface defined to substantially conform to an outer surface of said support structure.

3. The device of claim 1, wherein said first apertures and said second apertures receive attachment means for securing said bracket assembly to said support structure.

4. The device of claim 1 or 2, wherein said recessed area is defined by a wall circumscribed about said recessed area, and said raised portion has an outer peripheral surface for engagement with an inner surface of said wall.

5. The device of claim 4, wherein said recessed area further comprises one or more alignment bores and said raised portion further comprises one or more alignment pins extending from a front surface of said raised portion, wherein said alignment pins are positioned for engagement with said alignment bores.

6. The device of claim 1, wherein said mounting plate further comprises one or more slots defined in a peripheral surface of said plate.

7. The device of claim 1, wherein said adapter body is substantially triangular such that said attachment interface is positioned at an angle with respect to said bracket interface.

8. The device of claim 7, wherein said geometric surface is substantially planar.

9. The device of claim 1, wherein said adapter body comprises a plate and said attachment interface comprises an curved surface.

10. The device of claim 9, wherein said curved surface is cylindrically concave.

11. The device of claim 9, wherein said curved surface is cylindrically convex.

12. The device of claim 1, wherein said geometric surface is angular.

13. The device of claim 1, wherein said body is a substantially rectangular cylinder and said second end of said body has a angular surface.

14. The device of claim 1, wherein said body comprises a plate and a plurality of projections extending from said plate, wherein each projection is disposed for alignment and insertion in a plurality of bores defined in said adapter interface.

15. The device of claim 1, wherein a peripheral surface of said body substantially conforms to an outer surface of said rail supported by said bracket.

[16. A device for mounting a rail end to a support structure, the device comprising a bracket and a rail end cover;

a) said bracket comprising a mounting plate and a support flange extending from a first surface of said mounting plate, said mounting plate adapted for attachment to said support structure and said support flange adapted to support said rail end, said bracket further comprising at least one slot defined therein;

b) said rail end cover having an outer surface and an inner surface, wherein at least said inner surface is shaped to conform to an external surface of said rail end; and c) said rail end cover having at least one finger extending from said inner surface thereof; wherein said slot is adapted to receive said finger.]

[17. The device of claim 16, wherein said slot extends to a second surface opposite said mounting plate first surface.]

[18. The device of claim 16, wherein said rail end cover overlaps at least an upper portion of said rail end external surface.]

[19. The device of claim 16, wherein said rail end cover substantially encloses said rail end external surface.]

[20. The device of claim 16, wherein at least a portion of said rail end external surface is subjacent a portion of said inner surface of said rail end cover.]

[21. The device of claim 16, wherein said rail end cover is held in attachment to said bracket by cooperative engagement of said finger with said slot.]

22. [The device of claim 16] *A device for mounting a rail end to a support structure, the device comprising a bracket and a rail end cover; said bracket comprising a mounting plate and a support flange extending from a first surface of said mounting plate, said mounting plate adapted for attachment to said support structure and said support flange adapted to support said rail end, said bracket further comprising at least one slot defined therein; said rail end cover having an outer surface and an inner surface, wherein at least said inner surface is shaped to conform to an external surface of said rail end; and said rail end cover having at least one finger extending from said inner surface thereof; wherein said slot is adapted to receive said finger*, further comprising an adapter interface defined on a second surface of said mounting plate; an adapter having a *body with a* bracket interface defined at a first end of said body and an attachment interface defined at a second end of said body; wherein said adapter interface and said bracket interface abut each other; and [d)] said attachment interface comprises a geometric surface defined to substantially conform to an outer surface of said support structure.

23. The device of claim 22, wherein said geometric surface is substantially planar.

24. The device of claim 22, wherein said geometric surface is angularly displaced with respect to said mounting plate.

25. The device of claim 22, wherein said geometric surface has a radius of curvature.

26. [The device of claim 16 further comprising: a)] *A device for mounting a rail end to a support structure, the device comprising a bracket and a rail end cover; a) said bracket comprising a mounting plate and a support flange extending from a first surface of said mounting plate, said mounting plate adapted for attachment to said support structure and said support flange adapted to support said rail end, said bracket further comprising at least one slot defined therein; b) said rail end cover having an outer surface and an inner surface, wherein at least said inner surface is shaped to conform to an external surface of said rail end; c) said rail end cover having at least one finger extending from said inner surface thereof; wherein said slot is adapted to receive said finger, d)* an adapter interface defined on a second surface of the mounting plate; *e)* an adapter *body* having a bracket interface and an attachment interface wherein the attachment interface comprises a geometric shape defined to substantially conform to an outer surface of the support structure.

27. The device of claim 26, wherein the mounting plate further comprises one or more first apertures defined through the mounting plate and coaxially aligned with one or more second apertures defined through the adapter body.

28. The device of claim 27, wherein the first and second apertures receive attachment means for securing the bracket assembly to the support structure.

29. The device of claim 26, wherein the adapter interface and the bracket interface are defined to matingly engage each other.

30. The device of claim 26, wherein said adapter interface comprises a recessed area defined in a central portion of said second surface and said bracket interface comprises a raised portion extending from said first end of said adapter body and shaped to engage in said recessed area.

31. The device of claim 26 wherein the body comprises a plate and the attachment interface comprises a curved surface.

32. The device of claim 31, wherein the curved surface is concave.

33. The device of claim 31, wherein the curved surface is convex.

34. The device of claim 26, wherein the attachment interface has an angular surface.

35. The device of claim 34, wherein the angular surface is a right angle.

* * * * *